(12) United States Patent
Wang et al.

(10) Patent No.: US 11,084,945 B2
(45) Date of Patent: Aug. 10, 2021

(54) POWDER COATING COMPOSITION

(71) Applicant: KCC CORPORATION, Seoul (KR)

(72) Inventors: Hyeon Ung Wang, Gyeonggi-do (KR); Jin Seok Lee, Gyeonggi-do (KR); Sung Hwan Yun, Jeollabuk-do (KR)

(73) Assignee: KCC Corporation, Seoul (KR)

( * ) Notice: Subject to any disclaimer, the term of this patent is extended or adjusted under 35 U.S.C. 154(b) by 112 days.

(21) Appl. No.: 16/337,486

(22) PCT Filed: Oct. 10, 2017

(86) PCT No.: PCT/KR2017/011110
§ 371 (c)(1),
(2) Date: Mar. 28, 2019

(87) PCT Pub. No.: WO2018/070746
PCT Pub. Date: Apr. 19, 2018

(65) Prior Publication Data
US 2019/0345343 A1 Nov. 14, 2019

(30) Foreign Application Priority Data
Oct. 10, 2016 (KR) .................. 10-2016-0130590

(51) Int. Cl.
*C09D 5/03* (2006.01)
*C09D 7/47* (2018.01)
*C09D 163/00* (2006.01)

(52) U.S. Cl.
CPC .............. *C09D 5/035* (2013.01); *C09D 7/47* (2018.01); *C09D 163/00* (2013.01)

(58) Field of Classification Search
None
See application file for complete search history.

(56) References Cited

U.S. PATENT DOCUMENTS

| | | | |
|---|---|---|---|
| 5,686,185 A | 11/1997 | Correll et al. | |
| 7,183,346 B2 | 2/2007 | Edmondson | |
| 8,603,206 B2 | 12/2013 | Cai | |
| 9,676,961 B2 | 6/2017 | Sang et al. | |
| 9,925,729 B2 | 3/2018 | Sang et al. | |
| 2002/0090823 A1* | 7/2002 | Grubb .................. | C09D 163/00 438/699 |
| 2004/0211678 A1 | 10/2004 | Edmondson | |
| 2006/0167155 A1 | 7/2006 | Edmondson | |
| 2007/0293614 A1 | 12/2007 | Zhou et al. | |
| 2010/0237292 A1* | 9/2010 | Gan ...................... | C08G 18/003 252/500 |
| 2011/0162287 A1 | 7/2011 | Cai | |
| 2013/0149934 A1 | 6/2013 | Sang et al. | |
| 2015/0329738 A1* | 11/2015 | Vargas ............... | C08G 59/1477 524/611 |
| 2017/0182719 A1 | 6/2017 | Sang et al. | |

FOREIGN PATENT DOCUMENTS

| | | |
|---|---|---|
| JP | 2014-111773 A | 6/2014 |
| JP | 2014111773 | 6/2014 |
| KR | 20040071493 A | 8/2004 |
| KR | 20070070949 | 7/2007 |
| KR | 20070070949 A | 7/2007 |
| KR | 10-2012-0118572 A | 10/2012 |
| KR | 20120118572 | 10/2012 |
| KR | 20130074110 | 7/2013 |
| KR | 20130074110 A | 7/2013 |
| KR | 10-2014-0005476 A | 1/2014 |
| KR | 20140005476 | 1/2014 |
| KR | 10-2014-0109855 A | 9/2014 |
| KR | 10-1511613 B1 | 4/2015 |
| KR | 101511613 | 4/2015 |
| KR | 101958520 | 4/2018 |
| RU | 2351623 | 4/2009 |
| RU | 2408613 | 1/2011 |
| RU | 2014127858 | 1/2016 |
| RU | 2716427 | 3/2020 |
| WO | 2011090757 | 7/2011 |

OTHER PUBLICATIONS

Machine translation of Yeon et al. (KR 2014/0005476) (Year: 2014).*
Russian Office Action for RU 2019109126 dated Oct. 16, 2019. [No translation available.].
International Search Report dated Feb. 9, 2018 from International Patent Application No. PCT/KR2017/011110 filed Oct. 10, 2017.
Notice of Allowance dated Feb. 8, 2019 from Korean Patent Application No. 10-2016-0130590 filed Oct. 10, 2016.

* cited by examiner

*Primary Examiner* — Robert T Butcher
(74) *Attorney, Agent, or Firm* — Workman Nydegger

(57) ABSTRACT

The present invention provides a powder coating composition comprising a diisocyanate-modified bisphenol A epoxy resin, a curing agent, an auxiliary curing agent, an enhancer, and an extender pigment, wherein the auxiliary curing agent comprises an alkanolamine-modified epoxy polyol resin.

8 Claims, No Drawings

POWDER COATING COMPOSITION

The present application is a U.S. National Stage of International Application No. PCT/KR2017/011110, filed on Oct. 10, 2017, designating the United States and claiming the priority of Korean Patent Application No. 10-2016-0130590 filed with the Korean Patent Office on Oct. 10, 2016. All of the aforementioned applications are incorporated herein in their respective entireties by this reference.

TECHNICAL FIELD

The present invention relates to a powder coating composition, and more particularly, to a powder coating composition having a high glass transition temperature and demonstrating excellent heat resistance and mechanical properties.

BACKGROUND ART

Conventional epoxy resin powder coatings have a coating thermal characteristic of a glass transition temperature of approximately 100° C., and have been used for preventing corrosion and improving durability of steel pipes or pipe lines laid underground or underwater. However, as underwater environments for fluid extraction and transportation or pipe laying conditions are gradually becoming harsh, improvements of thermal, chemical and physical properties of epoxy coating are required for protecting pipes against corrosion.

In general, conventional epoxy powder coatings for use in pipes may undergo degradation in their capability of protecting pipes due to softened coatings when they are brought into contact with high-temperature petroleum of 100° C. or higher. To avoid this, it is necessary to form a coating having a glass transition temperature of 100° C. or higher.

U.S. Pat. No. 5,686,185 discloses a method of using a bisphenol A epoxy resin and a phenol curing agent, which is, however, disadvantageous to be used with high-temperature fluids in that a coating made therefrom has a low glass transition temperature while having superior flexibility and cathodic disbondment resistance.

Technical Problems to be Solved

It is an object of the present invention to provide a powder coating composition having a high glass transition temperature and high-temperature heat resistance and demonstrating excellent mechanical properties.

It is another object of the present invention to provide a coating formed using the powder coating composition and a steel pipe coated with the coating.

Technical Solutions

The present invention relates to a powder coating composition comprising a diisocyanate-modified bisphenol A epoxy resin, a curing agent, an auxiliary curing agent, an enhancer, and an extender pigment, wherein the auxiliary curing agent comprises an alkanolamine-modified epoxy polyol resin.

The powder coating composition may comprise 50 to 80 weight percent (wt %) of a diisocyanate-modified bisphenol A epoxy resin; 1 to 5 wt % of a curing agent; 1 to 5 wt % of an alkanolamine-modified epoxy polyol resin; 4 to 18 wt % of an enhancer; and 10 to 25 wt % of an extender pigment, based on the total weight of the powder coating composition.

The curing agent may be one or more selected from the group consisting of a polyhydric phenol curing agent, dicyandiamide, a hydrazide-based curing agent, phthalic anhydride, trimellitic anhydride, pyromellitic anhydride and benzophenone tetracarboxylic anhydride.

The alkanolamine-modified epoxy polyol resin may be an additional reaction product of an epoxy resin or a modified epoxy resin and alkanolamine.

The enhancer may be one or more selected from the group consisting of carboxy-terminated butadiene nitrile, amine-terminated butadiene nitrile, polysulfide, polythioether polymer, aliphatic triglycidyl ether, polyepoxide, aliphatic monoglycidyl ether, aliphatic epoxy resin, linear polybutadiene-polyacrylonitrile copolymer, oligomeric polysiloxane, and organopolysiloxane resin.

Meanwhile, the present invention also relates to a coating formed using the powder coating composition and a steel pipe coated with the coating.

Advantageous Effects

Since the powder coating composition according to the present invention has a glass transition temperature of 140° C. or higher to exhibit excellent high-temperature heat resistance and superior mechanical properties including flexibility, impact resistance, adhesion, chemical resistance, and so on, it can be effectively used to form a coating for a steel pipe.

BEST MODE FOR CARRYING OUT THE INVENTION

Hereinafter, the present invention will be described in detail.

The present invention relates to a powder coating composition comprising a diisocyanate-modified bisphenol A epoxy resin, a curing agent, an auxiliary curing agent, an enhancer and an extender pigment, wherein the auxiliary curing agent comprises an alkanolamine-modified epoxy polyol resin.

The diisocyanate-modified bisphenol A epoxy resin is a component involving a high glass transition temperature and properties of a coating, including chemical resistance, corrosion resistance, and so on.

The diisocyanate-modified bisphenol A epoxy resin may be commercially available in the market or may be directly synthesized and examples thereof may be prepared by performing an addition reaction of diisocyanates, such as methylene diphenyl diisocyanate, 2,6-toluene diisocyanate, 2,4-toluene diisocyanate, 4,4'-dicyclohexylmethane diisocyanate, trans-1,4-cyclohexane diisocyanate, isophorone diisocyanate, hexamethylene diisocyanate, etc. with bisphenol A epoxy resin.

The diisocyanate-modified bisphenol A epoxy resin may have an epoxy equivalent weight in the range from 375 to 475.

In addition, specific examples of the diisocyanate-modified bisphenol A epoxy resin may include methylene diphenyl diisocyanate-modified bisphenol A epoxy resin, and commercially available products, for example, D.E.R. 6510 HT manufactured by Olin Epoxy.

The diisocyanate-modified bisphenol A epoxy resin may be contained in an amount of 50 to 80 wt % based on the total weight of the powder coating composition. If the amount of the diisocyanate-modified bisphenol A epoxy resin is less than 50 wt %, it is difficult to attain a high glass transition temperature, and if the amount is greater than 80 wt %, the corrosion resistance, heat resistance and chemical resistance may be lowered.

The curing agent may be one or more selected from the group consisting of a polyhydric phenol curing agent, dicyandiamide, a hydrazide-based curing agent, phthalic anhydride, trimellitic anhydride, pyromellitic anhydride and benzophenone tetracarboxylic anhydride, and for example, a polyhydric phenol curing agent or dicyandiamide may be used.

The curing agent may be contained in an amount of 1 to 5 wt % based on the total weight of the powder coating composition. If the amount of the curing agent is less than 1 wt %, the resin may not be sufficiently cured, and if the amount of the curing agent is greater than 5 wt %, the water resistance and mechanical properties of the coating may be lowered.

The alkanolamine-modified epoxy polyol resin as an auxiliary curing agent is an additional reaction product of an epoxy resin or a modified epoxy resin and alkanolamine, and is used to improve curing density and high-temperature cathodic disbondment resistance.

The epoxy resin or the modified epoxy resin may include one or more selected from the group consisting of a bisphenol A epoxy resin having an epoxy equivalent weight in the range from 400 to 3,000, a bisphenol F epoxy resin having an epoxy equivalent weight in the range from 400 to 3,000, a polyol modified epoxy resin having an epoxy equivalent weight in the range from 400 to 3,000, a novolac modified epoxy resin having an epoxy equivalent weight in the range from 100 to 1,500, an isocyanate modified epoxy resin having an epoxy equivalent weight in the range from 100 to 1,500, and a cresol novolac modified epoxy resin having an epoxy equivalent weight in the range from 100 to 1,500.

The alkanolamine may include one or more selected from the group consisting of ethanolamine, diethanolamine, aminobuthanol, aminomethylbuthanol, aminoethylpropanol, trimethylolaminomethane, methylaminoethanol, ethylaminoethanol and isopropylaminoethanol.

The alkanolamine-modified epoxy polyol resin may be contained in an amount of 1 to 5 wt % based on the total weight of the powder coating composition. If the amount of the alkanolamine-modified epoxy polyol resin is less than 1 wt %, the corrosion resistance of the coating may be lowered, and if the amount of the alkanolamine-modified epoxy polyol resin is greater than 5 wt %, the water resistance and mechanical properties of the coating may be lowered and the coating is prone to a defect, like blister.

The enhancer may be used in preventing a coating composition from being brittle when the epoxy resin is cured, and may include a rubber compound or an epoxide-containing enhancer.

The enhancer may include one or more selected from the group consisting of carboxy-terminated butadiene nitrile, amine-terminated butadiene nitrile, polysulfide, polythioether polymer, aliphatic triglycidyl ether, polyepoxide, aliphatic monoglycidyl ether, aliphatic epoxy resin, linear polybutadiene-polyacrylonitrile copolymer, oligomeric polysiloxane and organopolysiloxane resins.

The epoxide-containing enhancer may have an epoxy equivalent weight in the range from 960 to 1,040.

Examples of commercially available enhancers may include Fortegra 100, Fortegra 102, or Fortegra 104 manufactured by Dow Chemical Company.

The enhancer may be contained in an amount of 4 to 18 wt % based on the total weight of the powder coating composition. If the amount of the enhancer is less than 4 wt %, the flexibility of the coating may be lowered, and if the amount of the enhancer is greater than 18 wt %, the glass transition temperature and the corrosion resistance may be lowered.

The extender pigment may provide a barrier effect by imparting chemical resistance, and resistance to pressures to the coating, and examples thereof may include barium sulfate, silicon dioxide, calcium carbonate, calcium silicate (e.g., wollastonite), feldspar, and so on.

The extender pigment may be contained in an amount of 10 to 25 wt % based on the total weight of the powder coating composition. If the amount of the extender pigment is less than 10 wt %, the chemical resistance and resistance to pressures may be lowered, and if the amount of the extender pigment is greater than 25 wt %, the mechanical property and the appearance may be lowered.

The powder coating composition according to the present invention may further comprise a curing accelerator, a color pigment, a leveling agent, and so on.

Any curing accelerator that is well known in the art may be used as the curing accelerator without particular limitation and preferably usable examples thereof may include one or more selected from the group consisting of imidazoles, an imidazole modified epoxy resin, triphenylphosphine and metal chelate.

For example, imidazoles, such as 1-methylimidazole, 2-methylimidazole, 1,2-dimethylimidazole, 1,5-dimethylimidazole, 2-buthyl-5-chloro-1H-imidazole-4-carbaldehyde, vinylimidazole, 1,1-carbonyldiimidazole, 2-ethyl-4-methylimidazole, 2-phenylimidazole, 2-ethylimidazole, 1-benzyl-2-methylimidazole, or 2-buthylimidazole, may be used as the curing accelerator.

The curing accelerator may be contained in an amount of 0.1 to 3 wt % based on the total weight of the powder coating composition. If the amount of the curing accelerator deviates from the above-stated range, mechanical properties of the coating may be lowered.

The color pigment may include one or more selected from the group consisting of organic pigments and inorganic pigments known in the art as colorants. Examples of the organic pigments and the inorganic pigments may include color pigments generally used for coloring in preparing powder coatings, such as ultramarine blue, phthalocyanine blue, phthalocyanine green or carbon black, and various types of inorganic pigments for adjusting properties and intensities of powder coatings, such as titanium dioxide. The color pigment may be contained in an amount of 1 to 5 wt % based on the total weight of the powder coating composition.

The leveling agent is used to improve appearance of a coating and any leveling agent may be used as long as it is generally used for a powder coating without particular limitation, including, for example, an acryl-based leveling agent or a silicon-based leveling agent.

The leveling agent may be contained in an amount of 0.1 to 5 wt % based on the total weight of the powder coating composition.

In addition, a dispersant may further be added to cause smooth dispersion in preparing the powder coating, and an adhesion promoter, etc. may also further be added.

A method for manufacturing the powder coating composition according to the present invention is not particularly limited, but the powder coating composition can be prepared using any method and equipment generally used in manufacturing the powder coating composition.

In addition, the present invention relates to a coating formed using the powder coating composition and a steel pipe coated with the coating.

Examples of coating methods include an electrostatic spray coating method, a fluidized bed coating method, a preheated coating method, and so on. In the electrostatic spray coating method, coating is formed by spraying powder coating with a voltage of 20 to 100 kV and an air pressure of 0.5 to 5 bar. In the fluidized bed coating method, coating is formed by fluidizing powder coating into a fluidized bed tank and depositing a preheated substrate in the fluidized bed tank and the thickness and ratio of a coating can be adjusted according to the deposition time and the number of deposition cycles. In the preheated coating method, a substrate is preheated in a batch furnace and the preheated substrate is then coated.

Hereinafter, the present invention will be described in more detail with reference to Examples, Comparative Examples and Experimental Example, which are provided only for explaining the present invention. Therefore, it is obvious to one skilled in the art that the scope of the present invention is not limited to those examples.

Preparation Example 1: Preparation of Alkanolamine-Modified Epoxy Polyol Resin

To a 4-necked flask equipped with a thermometer and a stirrer were added 880 g of a solid-phase bisphenol A epoxy resin (epoxy equivalent weight: 650) and 250 g of xylene as an organic solvent. The temperature of the reactor was elevated up to 90° C. while infusing nitrogen gas, thereby completely dissolving the solid-phase epoxy resin. After the complete dissolution, 75 g of diethanolamine and 80 g of trimethylolaminomethane were sequentially injected into the reactor. The temperature was elevated to 135° C. by spontaneous heat-emission to then be retained for 120 minutes. Thereafter, the initially used organic solvent was recovered while carrying out temperature elevation in a range of about 180° C., thereby obtaining the alkanolamine-modified epoxy polyol resin having a solid content of 99 wt % or greater.

Examples 1-3 and Comparative Examples 1-5: Preparation of Powder Coating Compositions Component ingredients listed in Table 1 were uniformly mixed and were then dry premixed using a Henschel mixer at 2,000 to 5,000 rpm for about 100 to 600 seconds. Then, the premixed materials were subjected to melt-mixing dispersion at a temperature of 90 to 120° C. using a dispersion device (PLK46, Buss). The melt-mixed materials were allowed to pass through a cooling roll and a cooling belt, yielding 50 to 100 mm long, 1 to 5 mm thick chips. Next, the chips were pulverized using a pulverizer (a hammer mill) to produce a powder coating having a homogenized particle size (40 to 60 μm in average particle size). Thereafter, the particle sizes of the powder coating were adjusted to allow the powder coating to have an average particle size of 30 to 50 microns and to contain less than 0.3 wt % of particles having particle sizes of greater than 250 microns.

TABLE 1

(Unit: wt parts)

| Component | Ex. 1 | Ex. 2 | Ex. 3 | Comp. Ex. 1 | Comp. Ex. 2 | Comp. Ex. 3 | Comp. Ex. 4 | Comp. Ex. 5 |
|---|---|---|---|---|---|---|---|---|
| Modified epoxy A-1 | | | | 95.00 | 95.00 | | 80.00 | |
| Modified epoxy A-2 | 85.00 | 85.00 | 85.00 | | | 100.00 | | 85.00 |
| Enhancer | 15.00 | 15.00 | 15.00 | 5.00 | 5.00 | | 20.00 | 15.00 |
| Curing agent | 4.20 | 3.70 | 3.70 | 3.30 | 3.20 | 3.70 | 2.70 | 3.80 |
| Aux. curing agent | 2.00 | 2.00 | 2.00 | | | | | |
| Curing accelerator | 0.60 | 0.80 | 0.80 | 1.00 | 1.00 | 1.00 | 1.00 | 0.80 |
| SA-31 | 0.50 | | | 0.50 | 0.50 | 0.50 | 0.50 | 0.50 |
| Leveling agent | 0.50 | 0.50 | 0.50 | 0.50 | 0.50 | 0.50 | 0.50 | 0.50 |
| Pigment C-1 | | 3.00 | 3.00 | 3.00 | 3.00 | 3.00 | 3.00 | 3.00 |
| Pigment C-2 | 5.00 | | | | | | | |
| Pigment C-3 | | 20.00 | | 40.00 | | | 45.00 | |
| Pigment C-4 | 20.00 | | | | 45.00 | 45.00 | | 45.00 |
| Pigment C-5 | 10.00 | | | | | | 10.00 | 10.00 |
| Pigment C-6 | | | 20.00 | | | | | |
| Adhesion promoter | 6.00 | 6.00 | 6.00 | 10.00 | 6.00 | 6.00 | 6.00 | 10.00 |
| MgO | | | | | 10.00 | | | |
| Total | 148.80 | 136.0 | 136.0 | 158.30 | 159.2 | 159.70 | 168.70 | 173.6 |

Modified epoxy A-1: Isocyanate-modified epoxy resin (KCC Corp.)
Modified epoxy A-2: Methylene diphenyl diisocyanate-modified bisphenol A epoxy resin(D.E.R. 6510 HT Specialty solid epoxy resin, Olin Epoxy)
Enhancer: FORTEGRA 104 (Dow Chemical Company)
Curing agent: Dicyanamide
Auxiliary curing agent: Alkanolamine-modified epoxy polyol resin prepared in Preparation Example 1
Curing accelerator: 2-methyl imidazole
Auxiliary curing accelerator: SA-31 (Salts of poly-carboxylic acid with cyclic amidine Z-Ton Co., Ltd.)
Leveling agent: PLP100 (KS Chemical Co., Ltd.)
Pigment C-1: Red pigment (Bayferrox 130M, Lanxess Deutschland GmbH)
Pigment C-2: White pigment (R60, Ningbo Chemical)
Pigment C-3: Barium sulfate (Barite) (NB0070, Korea Semiconductor Material Co., Ltd.)
Pigment C-4: Calcium silicate (Wollastonite) (NYAD 400, NYCO Minerals Inc.)
Pigment C-5: Zinc powder (Hanchang Ind. Co., Ltd., Korea)
Pigment C-6: Feldspar (MF200, Buyeo Materials Co., Ltd., Korea)
Adhesion promoter: KCC product
MgO: Magnesium oxide (Bright Sky Enterprise Co., Ltd.)

Experimental Example 1: Evaluation of Properties

Properties of test pieces coated with a coating formed using the powder coating compositions prepared in Examples and Comparative Examples were measured by the following experiments and methods, and the results thereof were summarized in Table 2.

(1) Glass Transition Temperature

The glass transition temperature was measured using a differential scanning calorimeter (DSC).

(2) Flexibility

To fabricate test pieces for testing flexibility, 25 mm (breadth)×300 mm (length)×6 mm (thickness) steel was prepared and then subjected to grit blasting for surface treatment. The surface-treated steel was preheated at 230° C., and the powder coating compositions prepared in Examples and Comparative Examples were coated on the steel surface to fabricate test pieces of coatings having a thickness of 350 μm using an electrostatic spray coating method or a fluidized bed coating method. Thereafter, temperatures of the test pieces were adjusted to room temperature and 0° C., and the test pieces were bent using mandrels tuned at angles of 3° and 2° to observe cracking of the coatings, thereby evaluating the flexibility of the coatings.

(3) Impact Resistance

Temperatures of test pieces fabricated in the same manner as in the flexibility evaluation were adjusted to 10° C., followed by applying impacts of 3 J/g and checking damages due to impacts applied through a holiday tester.

(4) Cathodic Disbondment Test

Test pieces for testing cathodic disbondment were fabricated in the same manner as in the flexibility evaluation, except that steel having a size of 100 mm (breadth)×100 mm (length)×6 mm (thickness) were prepared. Holes having a diameter of 3 mm were punched at centers of the test pieces and 3% saline was added to contact coating surfaces while blocking evaporation by means of vessels, followed by applying a voltage of 1.5 V to substrates at 130° C. for 28 days, thereby measuring disbondment distances from the holes twice. It may be understood that the greater the disbondment distance, the poorer the adhesion of the powder coating composition with respect to the substrate.

(5) Evaluation of Chemical Resistance

The chemical resistance was evaluated using electrochemical impedance spectroscopy (EIS).

EIS is a method for calculating impedance by measuring current based on an electrochemical phenomenon occurring at an interfacial surface of an electrochemical system when a constant voltage is applied to the electrochemical system and determining frequency-dependent changes in amplitudes and phases using AC waves. If the EIS value measured from a coating is not greater than a reference value (1.0 E+08), suggesting deteriorated electrical resistance, the coating may not properly exhibit its intrinsic properties.

"EIS STD" indicates an EIS value measured from a test piece coated with the coating composition, "EIS After" is an EIS value measured after the coated test piece was deposited in a 5% NaOH solution at 140° C. for 28 days.

Coatings having poor chemical resistance may undergo cathodic disbondment or blistering and have reduced "EIS After" values. That is to say, the smaller the ΔEIS, the better the chemical resistance.

TABLE 2

|  |  | Ex. 1 | Ex. 2 | Ex. 3 | Comp. Ex. 1 | Comp. Ex. 2 | Comp. Ex. 3 | Comp. Ex. 4 | Comp. Ex. 5 |
| --- | --- | --- | --- | --- | --- | --- | --- | --- | --- |
| DSC | Tg(° C.) | 155.84 | 154.11 | 155.44 | 138.38 | 139.51 | 151.53 | 133.34 | 153.18 |
| Flexibility | Room Temp. *3°/PD | NC | NC | NC | NC | NC | NC | NC | NC |
|  | 0° C.*2°/PD | NC | NC | NC | Cracks | Cracks | Cracks | NC | NC |
| Impact resistance | 10° C.*3 J/g | ND | ND | ND | ND | ND | ND | ND | ND |
| Cathodic disbondment (1.5v*130° C.*28 d) | 1 cycle(mm) | 9.2 | 6.75 | 7.81 | 11.0 | 10.0 | 10.5 | 9.8 | 9 |
|  | 2 cycles(mm) | 6.6 | 8.86 | 8.81 | 12.5 | 9.0 | 11.1 | 9.7 | 11 |
| EIS STD (Before) |  | 3.74E+10 | 1.46E+10 | 1.32E+10 | 3.42E+10 | 2.11E+10 | 2.56E+10 | 3.112E+10 | 3.22E+10 |
| EIS After (28 d*140° C.*5% NaOH) | 1 cycle | 7.23E+09 | 6.07E+10 | 6.85E+09 | 3.39E+07 | 3.05E+6 | 4.01E+7 | 1.55E+5 | 2.00E+06 |
|  | 2 cycles | 1.12E+10 | 2.47E+11 | 2.51E+09 | 9.00E+08 | 4.51E+7 | 1.95E+6 | 1.88E+6 | 3.30E+06 |

(NC: No cracks; ND: No damages)

As indicated in Table 2, the coatings formed from the powder coating compositions according to Examples 1 to 3 of the present invention had glass transition temperatures of 140° C. or higher and demonstrated super flexibility, impact resistance, adhesion and chemical resistance. However, the coatings formed from the powder coating compositions according to Comparative Examples, not comprising a diisocyanate-modified bisphenol A epoxy resin, an alkanolamine-modified epoxy polyol resin or an enhancer, had a glass transition temperature of lower than 140° C. and had poor flexibility, adhesion or chemical resistance.

Although the present invention has been described in detail with reference to specific embodiments thereof, it will be apparent to those skilled in the art that these embodiments are set forth for illustrative purposes and do not serve to limit the invention. Those skilled in the art will readily appreciate that many modifications and variations can be made without departing from the spirit and scope of the invention.

Accordingly, the scope of the present invention is defined in the appended claims and their equivalents.

The invention claimed is:

1. A powder coating composition comprising a diisocyanate-modified bisphenol A epoxy resin, a curing agent, an auxiliary curing agent, an enhancer, and an extender pigment, wherein the auxiliary curing agent comprises an alkanolamine-modified epoxy polyol resin,
which comprises 50 to 80 weight percent (wt %) of the diisocyanate-modified bisphenol A epoxy resin; 1 to 5 wt % of the curing agent; 1 to 5 wt % of the alkanolamine-modified epoxy polyol resin; 4 to 18 wt % of the enhancer; and 10 to 25 wt % of the extender pigment, based on the total weight of the powder coating composition, wherein the diisocyanate-modified bisphenol A epoxy resin has an epoxy equivalent weight in the range from 375 to 475, wherein the curing agent is dicyandiamide, wherein the enhancer is an epoxide-containing enhancer, and a ratio of the curing agent and the alkanolamine-modified epoxy polyol resin is 1.85 to 2.1:1 by weight.

2. The powder coating composition of claim 1, wherein the alkanolamine-modified epoxy polyol resin is an addition reaction product of an epoxy resin or a modified epoxy resin and alkanolamine.

3. The powder coating composition of claim 2, wherein the epoxy resin or the modified epoxy resin is one or more selected from the group consisting of a bisphenol A epoxy resin having an epoxy equivalent weight in the range from 400 to 3,000, a bisphenol F epoxy resin having an epoxy equivalent weight in the range from 400 to 3,000, a polyol modified epoxy resin having an epoxy equivalent weight in the range from 400 to 3,000, a novolac modified epoxy resin having an epoxy equivalent weight in the range from 100 to 1,500, an isocyanate modified epoxy resin having an epoxy equivalent weight in the range from 100 to 1,500, and a cresol novolac modified epoxy resin having an epoxy equivalent weight in the range from 100 to 1,500.

4. The powder coating composition of claim 2, wherein the alkanolamine is one or more selected from the group consisting of ethanolamine, diethanolamine, aminobutanol, aminomethylbutanol, aminoethylpropanol, trimethylolaminomethane, methylaminoethanol, ethylaminoethanol and isopropylaminoethanol.

5. The powder coating composition of claim 1, wherein the enhancer is one or more selected from the group consisting of aliphatic triglycidyl ether, polyepoxide, aliphatic monoglycidyl ether, and aliphatic epoxy resin.

6. The powder coating composition of claim 1, further comprising one or more additives selected from the group consisting of a curing accelerator, a color pigment and a leveling agent.

7. A coating formed using the powder coating composition of claim 1.

8. A steel pipe coated with the coating of claim 7.

* * * * *